US010878354B1

United States Patent
Zbikowski et al.

(10) Patent No.: US 10,878,354 B1
(45) Date of Patent: Dec. 29, 2020

(54) METHOD OF AND SYSTEM FOR AUTOMATED DEMAND PRIORITIZATION AND CONSISTENT COMMITMENT OF RESOURCES IN SUPPLY CHAIN MANAGEMENT

(71) Applicant: Flextronics AP, LLC, Broomfield, CO (US)

(72) Inventors: Krystian Zbikowski, Gdynia (PL); Marcin Fic, Lapino Dolne (PL)

(73) Assignee: Flextronics AP, LLC, Broomfield, CO (US)

( * ) Notice: Subject to any disclaimer, the term of this patent is extended or adjusted under 35 U.S.C. 154(b) by 373 days.

(21) Appl. No.: 14/597,977

(22) Filed: Jan. 15, 2015

Related U.S. Application Data

(60) Provisional application No. 61/927,800, filed on Jan. 15, 2014.

(51) Int. Cl.
*G06Q 10/00* (2012.01)
*G06Q 10/06* (2012.01)

(52) U.S. Cl.
CPC .............. *G06Q 10/06315* (2013.01)

(58) Field of Classification Search
CPC ......... G06Q 10/1095; G06Q 10/06315; G06Q 10/00–50/00
USPC .............................. 705/7.11–7.42
See application file for complete search history.

(56) References Cited

U.S. PATENT DOCUMENTS

| 4,563,937 | A | 1/1986 | Gerpheide | |
| 6,947,905 | B1* | 9/2005 | Starr | G06Q 10/06 705/37 |
| 7,346,534 | B1* | 3/2008 | Martin | G06Q 10/04 705/7.22 |
| 2003/0177050 | A1* | 9/2003 | Crampton | G06Q 10/06 700/97 |
| 2004/0122724 | A1* | 6/2004 | Wei | G06Q 10/06 705/7.22 |
| 2004/0230447 | A1 | 11/2004 | Schwerin-Wenzel | |
| 2004/0254805 | A1 | 12/2004 | Schwerin-Wenzel | |
| 2006/0254862 | A1* | 11/2006 | Hoersten | G06Q 10/06311 186/52 |
| 2007/0192157 | A1 | 8/2007 | Gooch | |
| 2007/0239299 | A1* | 10/2007 | Milne | G06Q 10/06 700/100 |
| 2007/0276717 | A1 | 11/2007 | Aburey | |
| 2007/0294146 | A1 | 12/2007 | Laksham | |
| 2008/0155015 | A1* | 6/2008 | Jensen | G06Q 40/04 709/203 |

(Continued)

OTHER PUBLICATIONS

Messina Productivity: Measurement Formulas for the Indirect Workforce, Perspectives on Business and Economics, Lehigh Preserve, 1983.

(Continued)

*Primary Examiner* — Eric W Stamber
*Assistant Examiner* — Mustafa Iqbal
(74) *Attorney, Agent, or Firm* — Haverstock&Owens LLP

(57) ABSTRACT

Methods of and devices for developing supply chain management are disclosed. Logic and devices implementing the logic for supply chain management avoid resources (e.g., machine component parts, raw materials, machines, machine capacity) being inappropriately re-allocated to customers without the customers' submission of forecasts in an accurate and timely manner.

20 Claims, 17 Drawing Sheets

(56) References Cited

U.S. PATENT DOCUMENTS

| | | | | |
|---|---|---|---|---|
| 2008/0201192 A1* | 8/2008 | Ueno | ............... | G06Q 10/06 |
| | | | | 705/7.22 |
| 2008/0288417 A1* | 11/2008 | Luessi | ............... | G06Q 40/06 |
| | | | | 705/36 R |
| 2011/0225023 A1* | 9/2011 | Evens | ............... | G06Q 10/087 |
| | | | | 705/7.31 |
| 2012/0029967 A1* | 2/2012 | Kukreja | ............... | G06Q 10/06 |
| | | | | 705/7.25 |

OTHER PUBLICATIONS

Krajewski et al., "Learning Curve Anlaysis", Operations Management, Pearson Education Inc., 2010.

* cited by examiner

| 3 Cust PN's | 2 Customers | 1 Flex PN |
|---|---|---|

| Cust PN | Customer | Flex PN | Concept | W01 | W02 | W03 | W04 | W05 |
|---|---|---|---|---|---|---|---|---|
| CPN1 | CUST1 | PN1 | PrevCommit(After Ship) | 0 | 100 P10 | 80 P20 | 120 P30 | 70 P40 |
| CPN1 | CUST1 | PN1 | PrevPriority | | | | | |
| CPN1 | CUST1 | PN1 | New FCST | 0 | 80 | 100 | 100 | 90 |
| CPN1 | CUST1 | PN1 | New Priority | | 80@P10 | 20@P10+80@P20 | | |

| Cust PN | Customer | Flex PN | Concept | W01 | W02 | W03 | W04 | W05 |
|---|---|---|---|---|---|---|---|---|
| CPN2 | CUST1 | PN1 | PrevCommit(After Ship) | 0 | 120 P10 | 70 P20 | 150 P30 | 150 P40 |
| CPN2 | CUST1 | PN1 | PrevPriority | | | | | |
| CPN2 | CUST2 | PN1 | New FCST | 0 | 150 | 100 | 120 | 150 |
| CPN2 | CUST1 | PN1 | New Priority | | 120@P10+30@P20 | 40@P20+60@P30 | | |

| Cust PN | Customer | Flex PN | Concept | W01 | W02 | W03 | W04 | W05 |
|---|---|---|---|---|---|---|---|---|
| CPN3 | CUST2 | PN1 | PrevCommit(After Ship) | 0 | 50 P10 | 60 P20 | 80 P30 | 60 P40 |
| CPN3 | CUST2 | PN1 | PrevPriority | | | | | |
| CPN3 | CUST2 | PN1 | New FCST | 0 | 60 | 50 | 70 | 60 |
| CPN3 | CUST1 | PN1 | New Priority | | 50@P10+10@P20 | 50@P20 | | |

Fig. 2D

| Cust PN | Customer | Flex PN | Concept | W01 | W02 | W03 | W04 | W05 | W06 |
|---|---|---|---|---|---|---|---|---|---|
| CPN1 | CUST1 | PN1 | PrevCommit(After Ship) | 0 | 100 | 80 | 120 | 70 | 0 |
| CPN1 | CUST1 | PN1 | PrevPriority | | | P20 | P30 | P40 | - |
| CPN1 | CUST1 | PN1 | New FCST | 0 | 80 | 100 | 100 | 90 | - |
| CPN1 | CUST1 | PN1 | New Priority | | 80@P10 | 20@P10+80@P20 | 100@P30 | 20@P30+70@P40 | - |
| CPN1 | CUST1 | PN1 | New Commit | 0 | 80 | 20+80 | | | |

| Cust PN | Customer | Flex PN | Concept | W01 | W02 | W03 | W04 | W05 | W06 |
|---|---|---|---|---|---|---|---|---|---|
| CPN2 | CUST1 | PN1 | PrevCommit(After Ship) | 0 | 120 | 70 | 150 | 150 | 0 |
| CPN2 | CUST1 | PN1 | PrevPriority | | P10 | P20 | P30 | P40 | - |
| CPN2 | CUST1 | PN1 | New FCST | 0 | 150 | 100 | 120 | 150 | - |
| CPN2 | CUST1 | PN1 | New Priority | | 120@P10+30@P20 | 40@P20+60@P30 | 90@P30+30@P40 | 120@P40+30@P9999 | - |
| CPN2 | CUST1 | PN1 | New Commit | 0 | 130 | | | | |

| Cust PN | Customer | Flex PN | Concept | W01 | W02 | W03 | W04 | W05 | W06 |
|---|---|---|---|---|---|---|---|---|---|
| CPN3 | CUST2 | PN1 | PrevCommit(After Ship) | 0 | 50 | 60 | 80 | 60 | 0 |
| CPN3 | CUST2 | PN1 | PrevPriority | | P10 | P20 | P30 | P40 | - |
| CPN3 | CUST2 | PN1 | New FCST | 0 | 60 | 100 | 70 | 60 | - |
| CPN3 | CUST2 | PN1 | New Priority | | 50@P10+10@P20 | 50@P20 | 70@P30 | 10@P30+50@P40 | - |
| CPN3 | CUST2 | PN1 | New Commit | 0 | 60 | | | | |

Supply

| Flex PN | W01 | W02 | W03 | W04 | W05 | W06 |
|---|---|---|---|---|---|---|
| PN1 | 0 | 270 | 210 | 350 | 270 | 30 |

Fig. 2H

| Cust PN | Customer | Flex PN | Concept | W01 | W02 | W03 | W04 | W05 | W06 |
|---|---|---|---|---|---|---|---|---|---|
| CPN1 | CUST1 | PN1 | PrevCommit(After Ship) | 0 | 100<br>P10 | 80<br>P20 | 120<br>P30 | 70<br>P40 | 0 |
| CPN1 | CUST1 | PN1 | PrevPriority | | | | | | - |
| CPN1 | CUST1 | PN1 | New FCST | 0 | 80 | 100 | 100 | 90 | - |
| CPN1 | CUST1 | PN1 | New Priority | 0 | 80@P10 | 20@P10+80@P20 | 100@P30 | 20@P30+70@P40 | - |
| CPN1 | CUST1 | PN1 | New Commit | 0 | 80 | 100 | 100 | 20 | - |

| Cust PN | Customer | Flex PN | Concept | W01 | W02 | W03 | W04 | W05 | W06 |
|---|---|---|---|---|---|---|---|---|---|
| CPN2 | CUST1 | PN1 | PrevCommit(After Ship) | 0 | 120<br>P10 | 70<br>P20 | 150<br>P30 | 150<br>P40 | 0 |
| CPN2 | CUST1 | PN1 | PrevPriority | | | | | | - |
| CPN2 | CUST1 | PN1 | New FCST | 0 | 150 | 100 | 120 | 150 | - |
| CPN2 | CUST1 | PN1 | New Priority | 0 | 120@P10+30@P20 | 40@P20+60@P30 | 90@P30+30@P40 | 120@P40+30@P9999 | - |
| CPN2 | CUST1 | PN1 | New Commit | 0 | 130 | 60 | 60+90+10 | | - |

| Cust PN | Customer | Flex PN | Concept | W01 | W02 | W03 | W04 | W05 | W06 |
|---|---|---|---|---|---|---|---|---|---|
| CPN3 | CUST2 | PN1 | PrevCommit(After Ship) | 0 | 50<br>P10 | 60<br>P20 | 80<br>P30 | 60<br>P40 | 0 |
| CPN3 | CUST2 | PN1 | PrevPriority | | | | | | - |
| CPN3 | CUST2 | PN1 | New FCST | 0 | 60 | 50 | 70 | 60 | - |
| CPN3 | CUST2 | PN1 | New Priority | 0 | 50@P10+10@P20 | 50@P20 | 70@P30 | 10@P30+50@P40 | - |
| CPN3 | CUST2 | PN1 | New Commit | 0 | 60 | 50 | 70 | 10 | - |

Supply

| Flex PN | W01 | W02 | W03 | W04 | W05 | W06 |
|---|---|---|---|---|---|---|
| PN1 | 0 | 270 | 210 | 350 | 270 | 30 |

Fig. 2I

| Cust PN | Customer | Flex PN | Concept | W01 | W02 | W03 | W04 | W05 | W06 |
|---|---|---|---|---|---|---|---|---|---|
| CPN1 | CUST1 | PN1 | PrevCommit(After Ship) | 0 | 100 | 80 | 120 | 70 | 0 |
| CPN1 | CUST1 | PN1 | PrevPriority | | P10 | P20 | P30 | P40 | - |
| CPN1 | CUST1 | PN1 | New FCST | 0 | 80 | 100 | 100 | 90 | - |
| CPN1 | CUST1 | PN1 | New Priority | | 80@P10 | 20@P10+80@P20 | 100@P30 | 20@P30+70@P40 | - |
| CPN1 | CUST1 | PN1 | New Commit | 0 | 80 | 100 | 100 | 20+70 | - |

| Cust PN | Customer | Flex PN | Concept | W01 | W02 | W03 | W04 | W05 | W06 |
|---|---|---|---|---|---|---|---|---|---|
| CPN2 | CUST1 | PN1 | PrevCommit(After Ship) | 0 | 120 | 70 | 150 | 150 | 0 |
| CPN2 | CUST1 | PN1 | PrevPriority | | P10 | P20 | P30 | P40 | - |
| CPN2 | CUST1 | PN1 | New FCST | 0 | 150 | 100 | 120 | 150 | - |
| CPN2 | CUST1 | PN1 | New Priority | | 120@P10+30@P20 | 40@P20+60@P30 | 90@P30+30@P40 | 30@P9999 | - |
| CPN2 | CUST1 | PN1 | New Commit | 0 | 130 | 60 | 180 | 120 | - |

| Cust PN | Customer | Flex PN | Concept | W01 | W02 | W03 | W04 | W05 | W06 |
|---|---|---|---|---|---|---|---|---|---|
| CPN3 | CUST2 | PN1 | PrevCommit(After Ship) | 0 | 50 | 60 | 80 | 60 | 0 |
| CPN3 | CUST2 | PN1 | PrevPriority | | P10 | P20 | P30 | P40 | - |
| CPN3 | CUST2 | PN1 | New FCST | 0 | 60 | 50 | 70 | 60 | - |
| CPN3 | CUST2 | PN1 | New Priority | | 50@P10+10@P20 | 50@P20 | 70@P30 | 10@P30+50@P40 | - |
| CPN3 | CUST2 | PN1 | New Commit | 0 | 60 | 50 | 70 | 10+50 | - |

Supply

| Flex PN | W01 | W02 | W03 | W04 | W05 | W06 |
|---|---|---|---|---|---|---|
| PN1 | 0 | 270 | 210 | 350 | 270 | 30 |

Fig. 2J

| Cust PN | Customer | Flex PN | Concept | W01 | W02 | W03 | W04 | W05 | W06 |
|---|---|---|---|---|---|---|---|---|---|
| CPN1 | CUST1 | PN1 | PrevCommit(After Ship) | 0 | 100 | 80 | 120 | 70 | 0 |
| CPN1 | CUST1 | PN1 | PrevPriority |  | P10 | P20 | P30 | P40 | - |
| CPN1 | CUST1 | PN1 | New FCST | 0 | 80 | 100 | 100 | 90 | - |
| CPN1 | CUST1 | PN1 | New Priority |  | 80@P10 | 20@P10+80@P20 | 100@P30 | 20@P30+70@P40 |  |
| CPN1 | CUST1 | PN1 | New Commit | 0 | 80 | 100 | 100 | 90 |  |

| Cust PN | Customer | Flex PN | Concept | W01 | W02 | W03 | W04 | W05 | W06 |
|---|---|---|---|---|---|---|---|---|---|
| CPN2 | CUST1 | PN1 | PrevCommit(After Ship) | 0 | 120 | 70 | 150 | 150 | 0 |
| CPN2 | CUST1 | PN1 | PrevPriority |  | P10 | P20 | P30 | P40 | - |
| CPN2 | CUST1 | PN1 | New FCST | 0 | 150 | 100 | 120 | 150 | - |
| CPN2 | CUST1 | PN1 | New Priority |  | 120@P10+30@P20 | 40@P20+60@P30 | 90@P30+30@P40 | 120@P40+30@P9999 |  |
| CPN2 | CUST1 | PN1 | New Commit | 0 | 130 | 60 | 180 | 120 | 30 |

| Cust PN | Customer | Flex PN | Concept | W01 | W02 | W03 | W04 | W05 | W06 |
|---|---|---|---|---|---|---|---|---|---|
| CPN3 | CUST2 | PN1 | PrevCommit(After Ship) | 0 | 50 | 60 | 80 | 60 | 0 |
| CPN3 | CUST2 | PN1 | PrevPriority |  | P10 | P20 | P30 | P40 | - |
| CPN3 | CUST2 | PN1 | New FCST | 0 | 60 | 50 | 70 | 60 | - |
| CPN3 | CUST2 | PN1 | New Priority |  | 50@P10+10@P20 | 50@P20 | 70@P30 | 10@P30+50@P40 |  |
| CPN3 | CUST2 | PN1 | New Commit | 0 | 60 | 50 | 70 | 60 |  |

Supply

| Flex PN | W01 | W02 | W03 | W04 | W05 | W06 |
|---|---|---|---|---|---|---|
| PN1 | 0 | 270 | 210 | 350 | 270 | 30 |

Fig. 2K

METHOD OF AND SYSTEM FOR AUTOMATED DEMAND PRIORITIZATION AND CONSISTENT COMMITMENT OF RESOURCES IN SUPPLY CHAIN MANAGEMENT

CROSS-REFERENCE TO RELATED APPLICATION(S)

This application claims priority under 35 U.S.C. § 119(e) of the U.S. Provisional Patent Application Ser. No. 61/927,800, filed Jan. 15, 2014 and titled, "SUPPLY CHAIN," which is hereby incorporated by reference in its entirety for all purposes.

FIELD OF THE INVENTION

The present invention relates to supply chain management. More specifically, the present invention relates to providing resources in a supply chain, ensuring that priority commitments are met, as much as possible, regardless of changes in customer demands or available supply.

BACKGROUND OF THE INVENTION

Typical manufacture resource planning (MRP) considers the demand date as the priority driver based on a first-come-first-serve (FIFO) method. The typical MRP can result in customers "stealing" goods (e.g., products or families of products) previously committed to other customers. Such situations can cause the so-called Bullwhip effect, forcing suppliers earlier in the supply chain to maintain increasing amounts of excess inventory to ensure that they can meet commitments.

A typical method to avoid this problem includes keeping separate item codes for different customers, products, and families of product lines. This method is both wasteful and inefficient.

SUMMARY OF THE INVENTION

Methods of and devices for managing supply chains are disclosed. Logic and devices for implementing the logic ensure that resources allocated in a supply chain are not inappropriately re-allocated to customers without the customers' submission of forecasts in an accurate and timely manner. The logic and devices ensure that previously committed customer demands are met by their promised dates, even when the demand picture across all customers change.

In a first aspect, a supply chain management method includes assigning a first set of priority values to a first set of forecasted demand numbers based on a time sequence of the forecasted demand numbers; determining differences between corresponding numbers in the first set of forecasted demand numbers and a subsequently received second set of forecasted demand numbers; and assigning a second set of priority values to the differences. Preferably, the method is automated, and available resources are allocated based on the second set of priority values.

In one embodiment, the first and second sets of forecasted demand numbers correspond to amounts of resources required by a customer over a fixed length of time, including, but not limited to, a week, a month, or a multi-month period. In one embodiment, the method also includes receiving, at a supplier, forecasted demand numbers for a resource for different customers at different times and with varying frequencies.

In one embodiment, a smaller priority value corresponds to a higher priority. In another embodiment, a smaller priority value corresponds to a lower priority.

Resources include machine component parts, raw materials, or machine capacities. These are only examples. Other resources are able to be prioritized and allocated in accordance with the invention.

In a second aspect, a method of managing customer orders includes receiving a first customer's forecasted quantities of a resource for sequential time periods, receiving a second customer's forecasted quantities of the resource for the sequential time periods, assigning priority values to the first and second customer's forecasted quantities according to a sequence of the time periods, receiving the second customer's updated forecasted quantities for the sequential time periods, assigning updated priority values to differences between corresponding ones of the second customer's forecasted quantities and updated forecasted quantities, wherein the updated priority values are based on a date that the second customer's updated forecasted requirements is received by a supplier.

In one embodiment, forecasted quantities for the sequential time periods are assigned sequentially increasing priority values. In one embodiment, priority values for the sequential times periods incorporate inherent priority values from previous time periods.

Preferably, the method also includes allocating available resources based on the second set of priority values. In one embodiment, the method also includes storing the second set of priority values and the differences for subsequent cycles of demand evaluation.

In a third aspect, a method of distributing units of a resource to first and second customers includes receiving from a first customer forecasted demands for the units on a first date, the forecasted demands having a first set of priority values; receiving from a second customer forecasted demands for the units on a second date, the forecasted demands having a second set of priority values; and distributing the units to the first and second customers, wherein when an insufficient number of units is available to meet demands of both the first and second customers, the distribution is determined from the first and second dates and the first and second sets of priority values. The forecasted demands of the second customer are updated forecasted demands. The second set of priority values are based on differences between corresponding ones of the forecasted demands of the second customer and the updated forecasted demands.

In a fourth aspect, an automated supply commitment and distributing apparatus includes a priority assigning device, a time-phased inventory checking device, and a distributing device configured to distribute one or more resources based on a first set of priority values assigned to a preselected portion of the resource and a second set of priority values reassigned to remaining portions of the resource.

Other features and advantages of the present invention will become apparent after reviewing the detailed description of the embodiments set forth below.

BRIEF DESCRIPTION OF THE DRAWINGS

Embodiments will now be described by way of examples, with reference to the accompanying drawings, which are meant to be exemplary and not limiting. For all figures mentioned herein, like numbered elements refer to like elements throughout.

FIGS. 2A-2L illustrate a portion of a priority assignment system, during different stages of a priority assignment and resource allocation process, in accordance with one embodiment of the invention.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application- and business-related constraints, and that these specific goals vary from one implementation to another and from one developer to another. Moreover, it is appreciated that such a development effort can be complex and time consuming, but is nevertheless a routine undertaking of engineering for those of ordinary skill in the art having the benefit of this disclosure.

Figure 1:
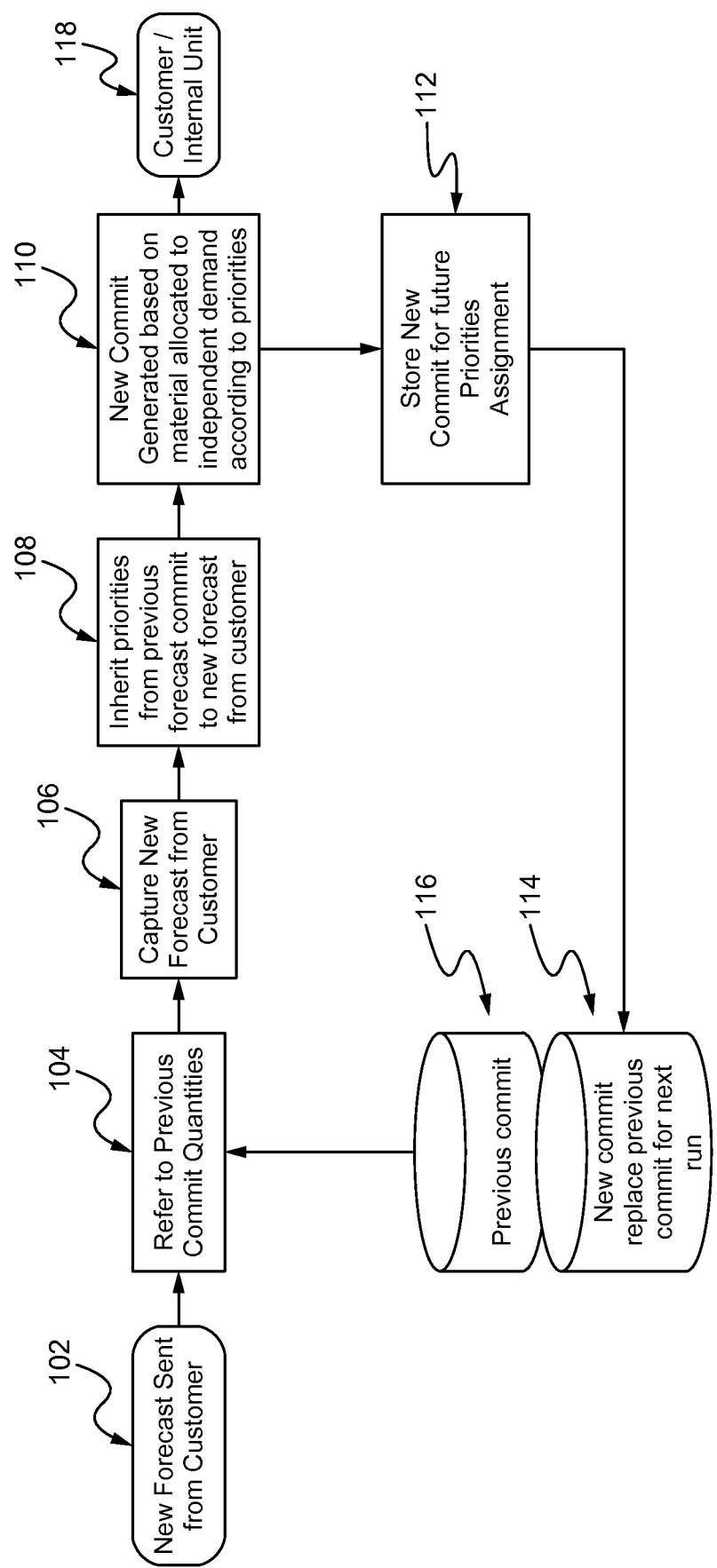
FIG. 1 illustrates a priority assignment method in accordance with one embodiment of the invention.

FIG. 1 illustrates the steps of a priority assignment and resource allocation method 100 in accordance with one embodiment of the present invention. In one embodiment, the steps are performed automatically on a computer system, such as a priority assignment device. The method 100 starts at Step 102, in which a first forecast is received from customers. The first forecast can be the quantity of a particular resource, such as a number of components, a weight of materials, a number of raw materials, or a machine capacity, to name only a few examples. At Step 104, reference is made to previous committed quantities, which are used as a baseline for a second forecast (new demand forecast) comparison. At Step 106, the new forecast is loaded into a system's (e.g., the "supply node's") customer/internal unit. At Step 108, priority is inherited from the previous forecast to the new forecast for resource allocation. At Step 110, a second commit (new commit) is generated based on available resources allocated to an independent demand according to priorities and the demand due date, also referred to as "Capable To Promise" (CTP). From Step 110, the method proceeds to both Steps 118 and 112. At Step 118, the newly generated commit is provided to the Customer and/or internal unit from which the demand originated. At Step 112, the second commit for future priority assignments is stored, which can later be considered as the prior commitment for the next period of priority assignment. At Step 114, the second commit replaces the previous first commit. At Step 116, the second commit is used as the baseline for the consideration of the third forecast at the Step 104.

FIGS. 2A-2L show an element of a system 200 for performing a method of managing a supply, at different stages of the method, in accordance with one embodiment of the invention. As one example, the system 200 is a priority assignment system that uses tables to perform the method. The system 200 assigns priorities an allocates resources in a distribution chain and includes a memory storing computer-executable instructions for performing the steps of a supply chain management method (e.g., methods 100, 200, 300, or 400) and a processor to execute the steps. In different embodiments, the system 200 also includes a robot arm to package resources for distribution to customers or other mechanical elements.

Figure 2A:
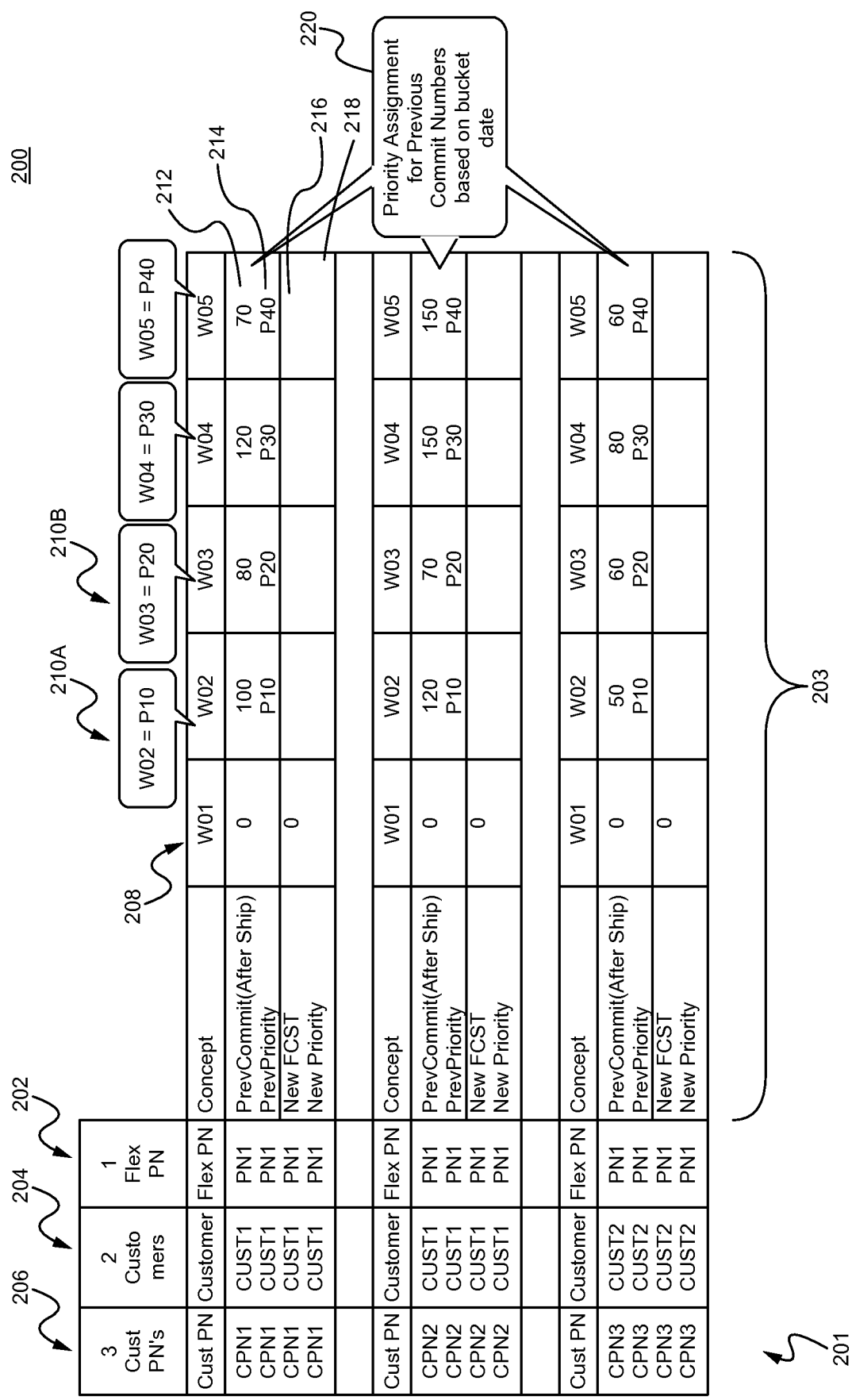

As shown in FIG. 2A, the system 200 includes a table 201 at an initial processing stage. The table 201 includes a supplier's part reference number 202, such as hard drive part number PN1, a customer number 204 associated with different customers or groups, a customer's part number 206, which can be different from the supplier's part number 202, and thus used for cross-referencing, a data area 203 having time progress 208 (such as weeks), an original customer commit number 212, original priority 214, a first forecast 216 (e.g., new forecast), and a first priority 218 (e.g., new priority). At this stage, the new forecast 216 and the new priority slots 218 are empty. The assignment for the original priority 214 can be based on a bucket date. For example, the original priority 214 for week 2 has a priority P=10, week 3 has a priority P=20, and week 4 has a priority P=30. In some embodiments, the system 200 assigns ascending priorities according to the bucket date based on the customer's part number 206. If there are insufficient resources to fulfill all customer demands, then the available supply is distributed in ascending order according to the priority assigned. Otherwise, supply is allocated according to dates that the forecasts are received on the system, first come first served.

Figure 2B:
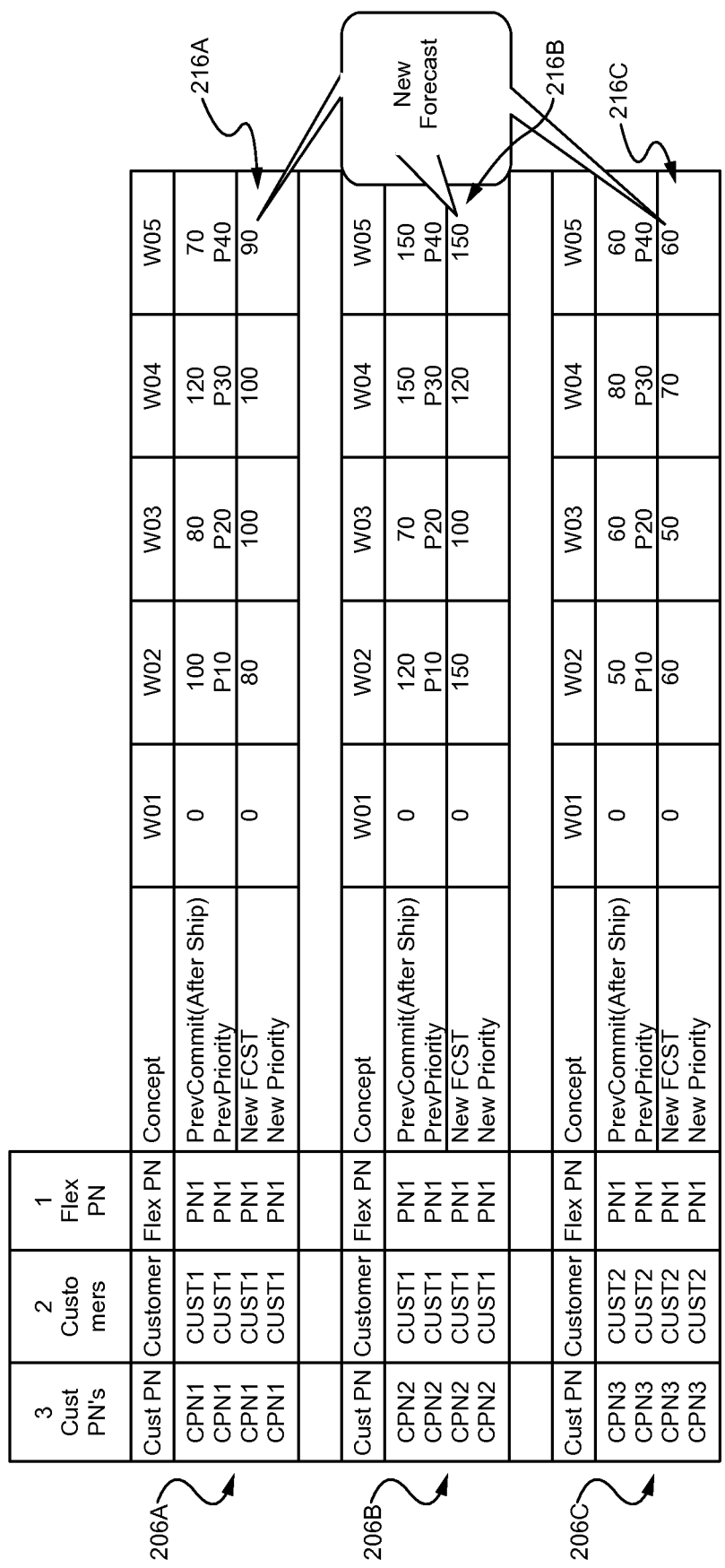

In FIG. 2B, the system 200 receives the data for the new forecast 216, which are associated with the new forecast 216A for the customer part number 1 (CPN1) 206A, the new forecast 216B for the customer part number 2 (CPN2) 206B, and the new forecast 216C for the customer part number 3 (CPN3) 206C. The new forecast 216 shows the customer's forecast of future needs of a particular part or a product.

Figure 2C:
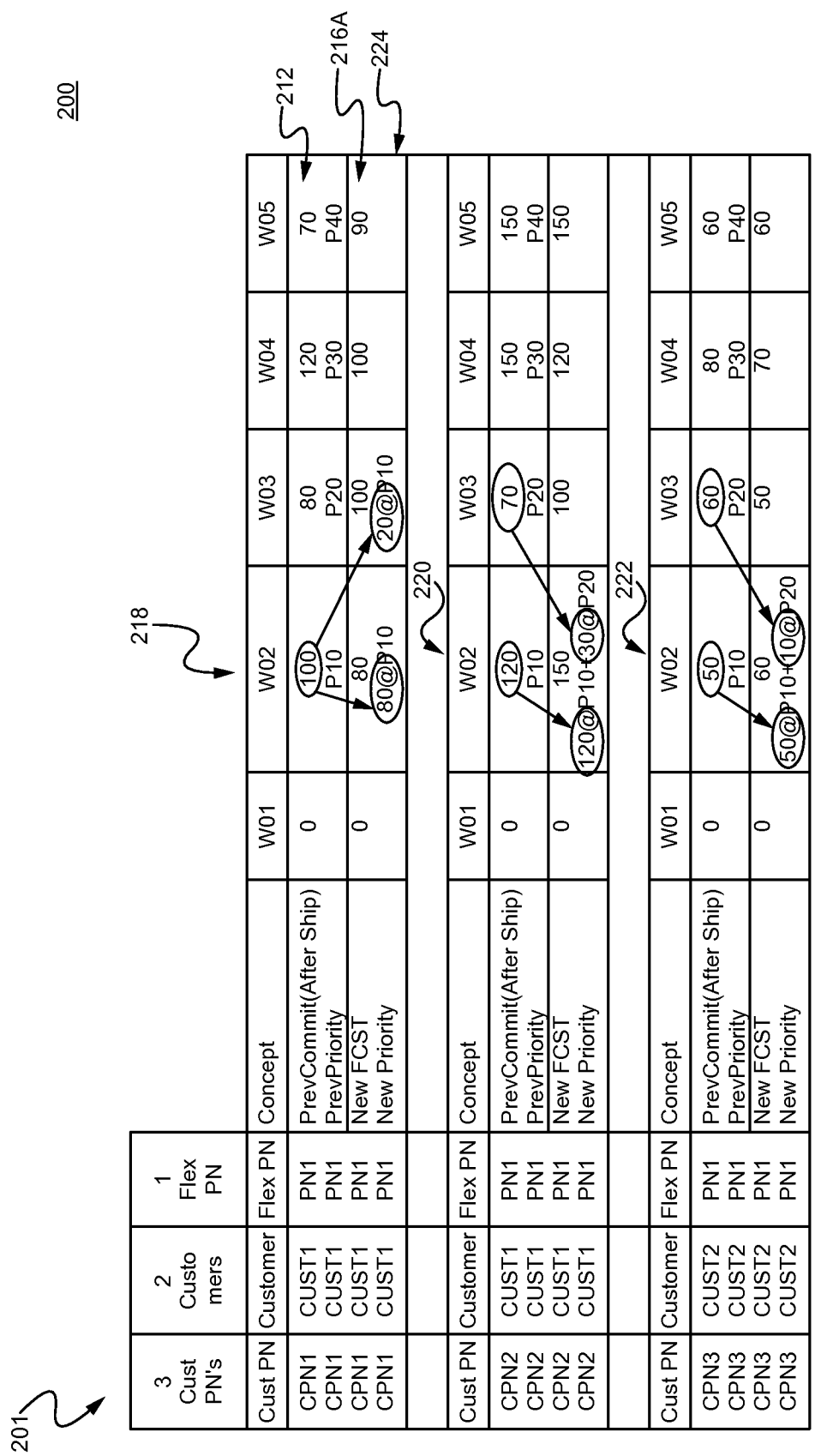

FIG. 2C shows that the system 200 inherits and reschedules priorities from the original commit to the first forecasts 216A-C. As shown in the column 218, week 2 of the Table 201 shows that the new forecast 216A is 80 units, so that the system 200 assigns priority P=10 to the 80 units to be supplied at week 2, and assigns the 20 remaining priority P=10 in week 3 (224). Similar methods can be applied in the column 220. The previous commit for week 2 is 120 units. Since the new forecast is 150, the new priority would have 120 units from the priority P=10 and borrow 30 units from the priority P=20 from the week 3. In the column 222, the previous commit is 50 units. Since the new forecast shows that 60 units are needed, 50 units from the priority P=10 are taken and the shortage of 10 units are taken from the priority P=20. As shown in FIG. 2C, at this stage, advantageously the 20 unit demand for CPN1 (Customer 1) in week 3 is secured at P=10, the highest priority at that week. In this way, the method ensures that demand increases on CPN2 and CPN3 do not "steal" the quantity committed to CPN1.

FIG. 2D shows that the system 200 assigns the priorities for a second new demand schedule in week 3. As shown in a data area 225, the new forecast needs 100 units, while the previous commit is only 80 units. Accordingly, the system 200 takes the 20 units from the priority P=10 (the previous weeks' excess at that priority) and fulfills the remaining 80 units from the priority P=20 for week 3. Similar rules apply to data areas 226 and 228 for customer part numbers CPN2 and CPN3, respectively.

Figure 2E:
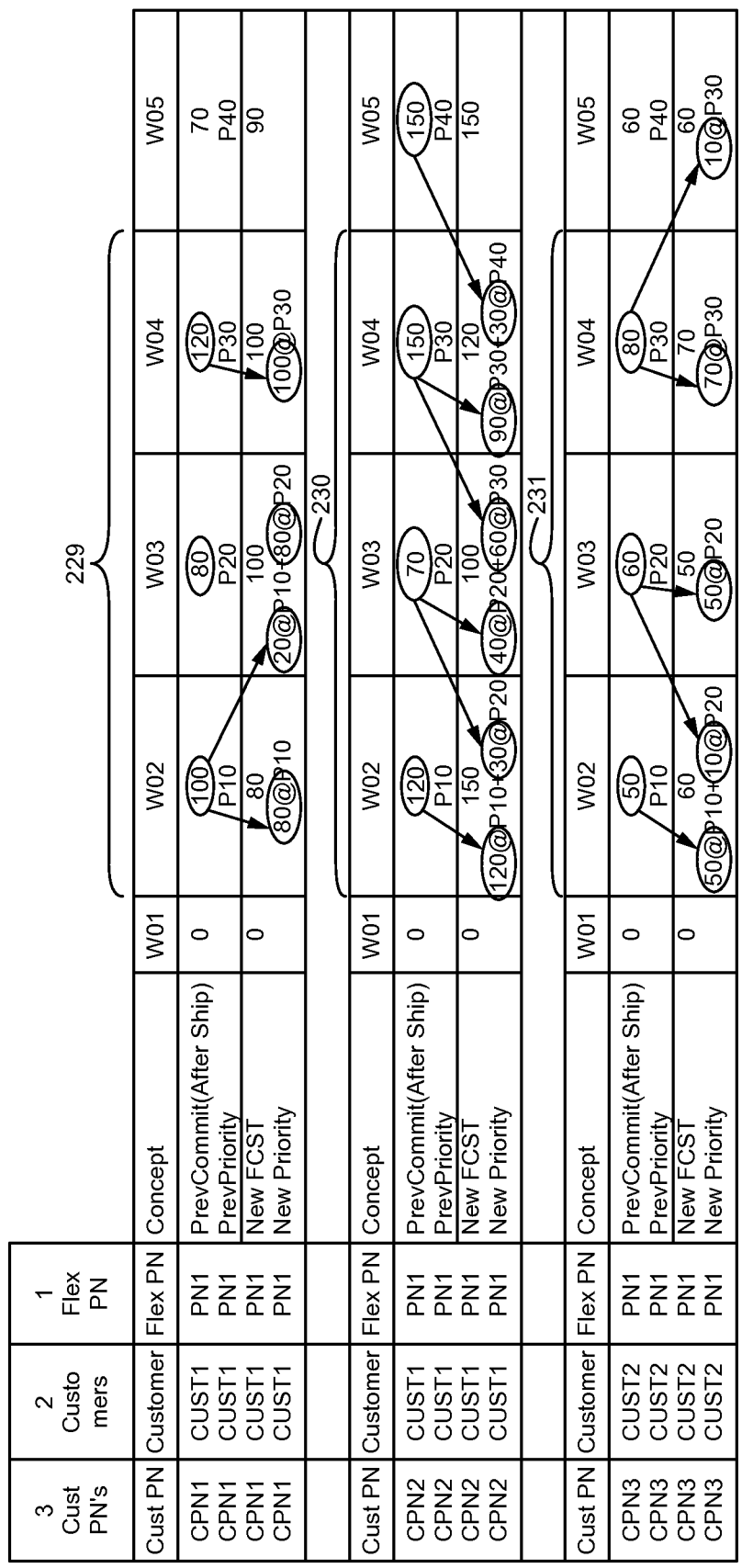

FIG. 2E shows that the system 200 assigns the priorities for a third new demand schedule in week 4. As shown in a data area 229 of the Table 201, 120 units are shown as the previous commit while 100 units are needed as indicated by the new forecast for week 4. Accordingly, the system 200 assigns the needed 100 units with its original priority P=30, leaving the remaining 20 units with priority P=30 to be used for week 5. Similar rules apply to the data areas 230 and 231 for customer part numbers CPN2 and CPN3, respectively.

Figure 2F:
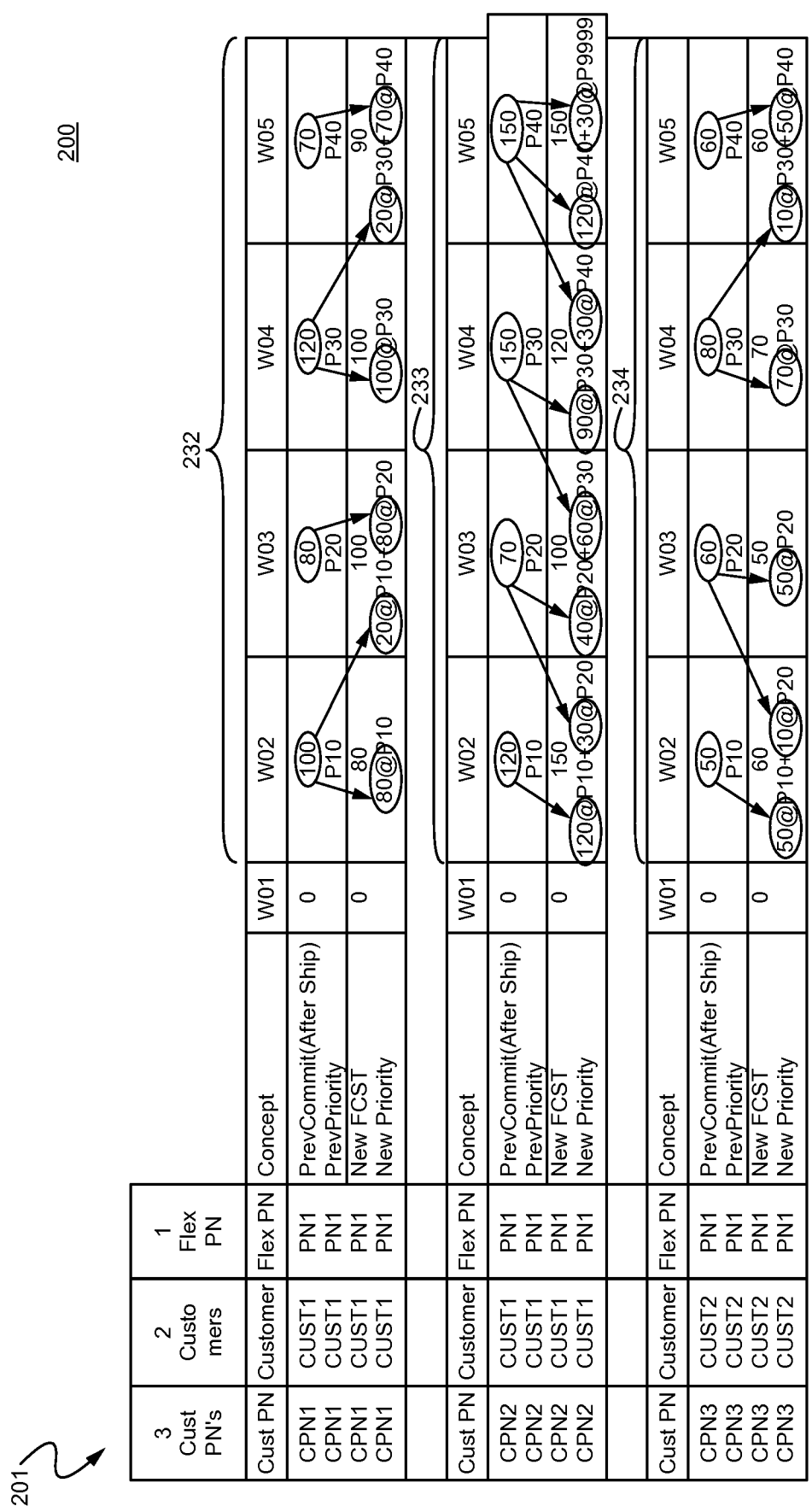

FIG. 2F shows that the system 200 assigns the priorities for a new demand schedule for week 5. As shown in a data area 232 of Table 201, 70 units are shown as the previous commit, while 90 units are needed as indicated by the new forecast for week 5. Accordingly, the system 200 takes 20 units with priority P=30 from week 4 and 70 units with priority P=40. Similar rules apply to the data areas 233 and 234 for customer part numbers CPN2 and CPN3, respectively. In the event that the new demand is greater than the previous commit, new demands are assigned the highest possible number (value) for a priority, such as P=9999, which is illustrated as data 233.

Figure 2G:
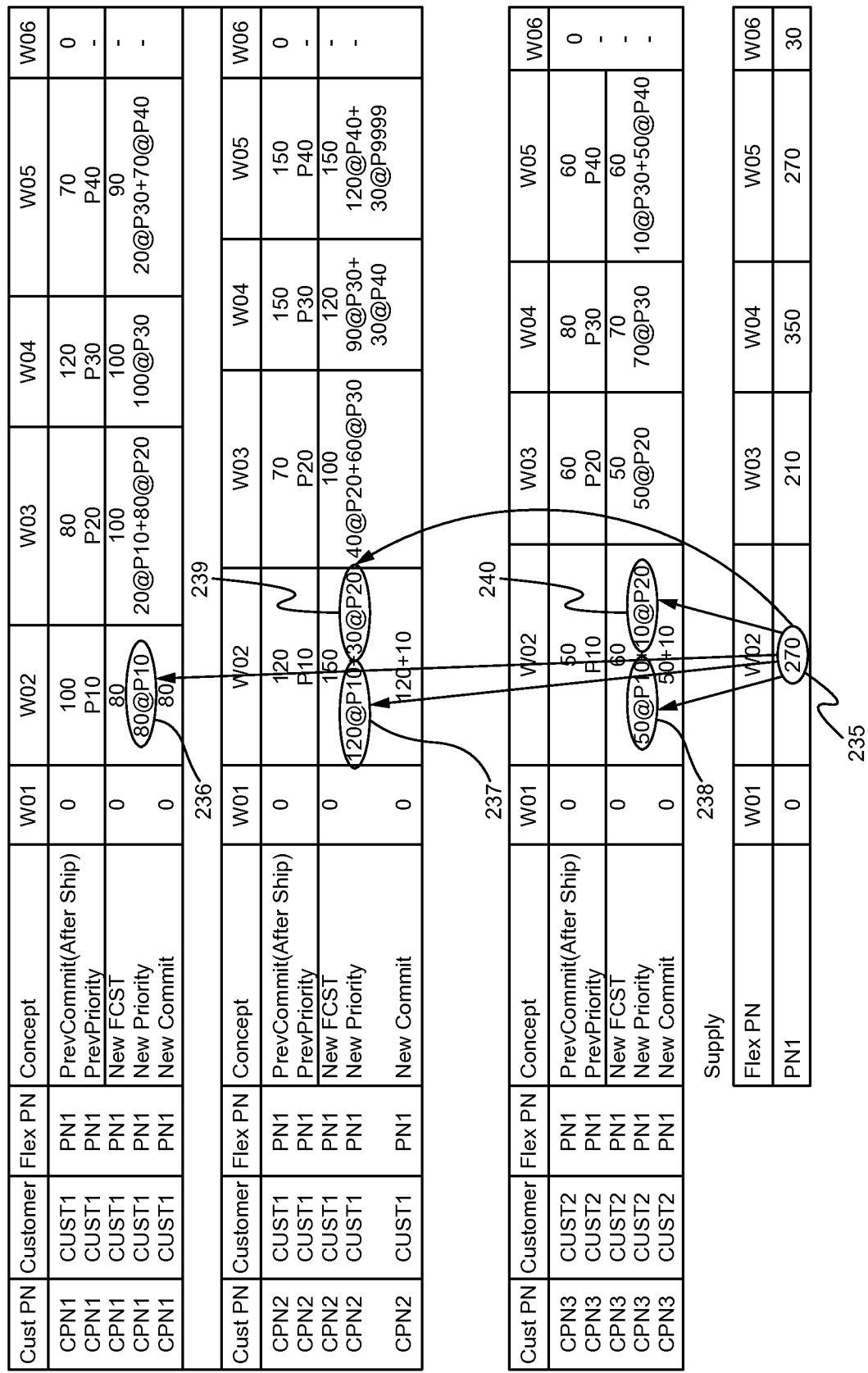

FIG. 2G shows that the system 200 generates new commits based on resources allocated to an independent demand according to calculated/inherited priorities and demand due dates. The supply of 270 units in the second week is distributed according to the priority number. The 80 units for Customer Part Number 1 (data area 236), 120 units for Customer Part Number 2 (data area 237), and 50 units for Customer Part Number 3 (data area 238) all have a lower priority number (e.g., P=10), so a portion of the supply of 270 units (data area 235) is first allocated to the lower priority number. Next, the remaining 20 units of the available supply (data area 235) are equally allocated to the next priority demand for the Customer Part Number 2 (data area 239) and Customer Part Number 3 (data area 240).

Figure 2L:
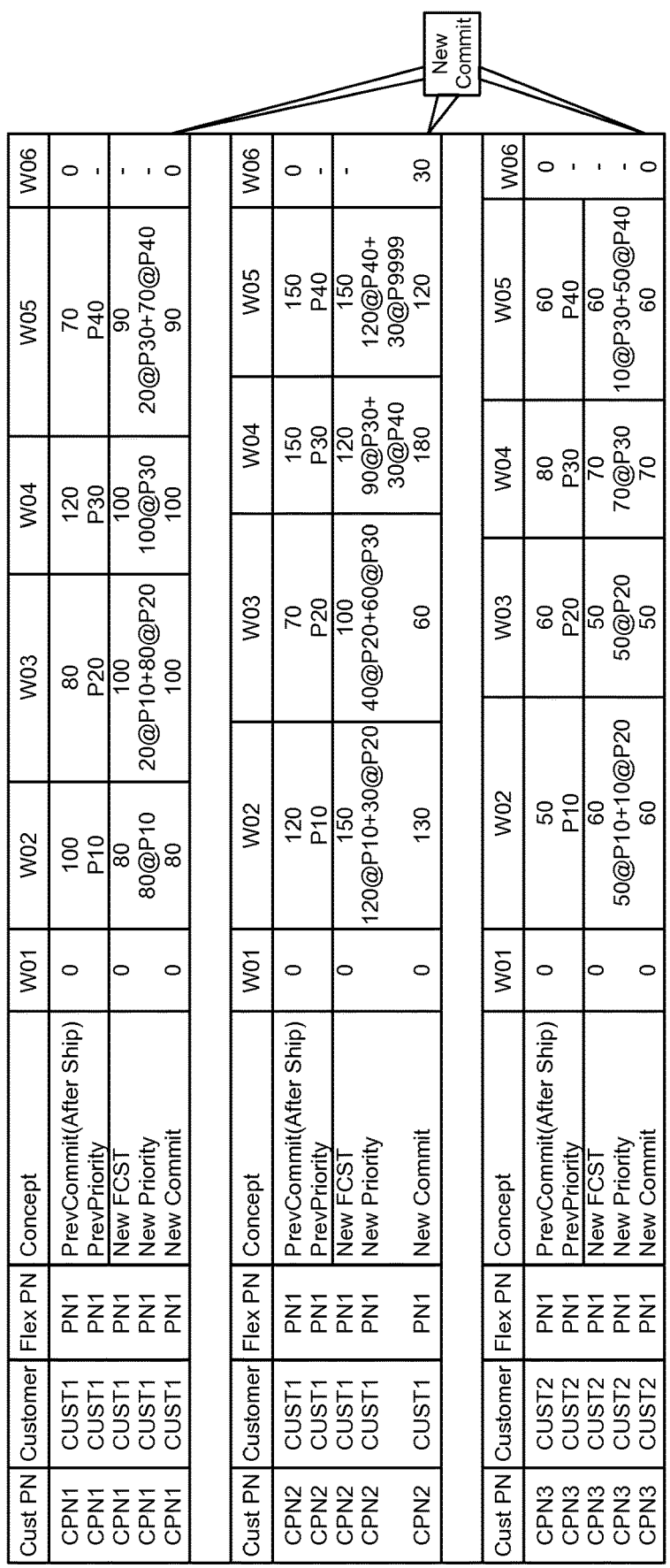

FIG. 2H shows that the system 200 allocates the supply coming in on week 3. The available 210 units in week 3 are allocated having 20 units distributed to the priority P=10 demand for Customer Part Number 1, week 3, then 20 units allocated to priority P=20 demand for Customer Part Number 2, week 2, then the remaining 170 units are distributed to the current week 3 with lower priority numbers. This means that 170 units are allocated to all week 3 demands with priority P=20. Because there is no more available supply in week 3, all demand for Customer Part Number 2 with priority P=30 is uncommitted on week 3. Similarly, the supply of week 4 and week 5 are supplied as the method described above, which are shown in FIGS. 2I and 2J respectively. FIG. 2K shows that the available 30 units for the week 6 are supplied to the highest priority number for Customer Part Number 2, week 5. FIG. 2L shows the final commit of the supply.

It will be appreciated that the table 201 is merely illustrative of one example. In accordance with other embodiments, systems can use different tables, with fewer elements than are shown in FIGS. 2A-L, more elements, different elements, or any combination of these.

Figure 3A:
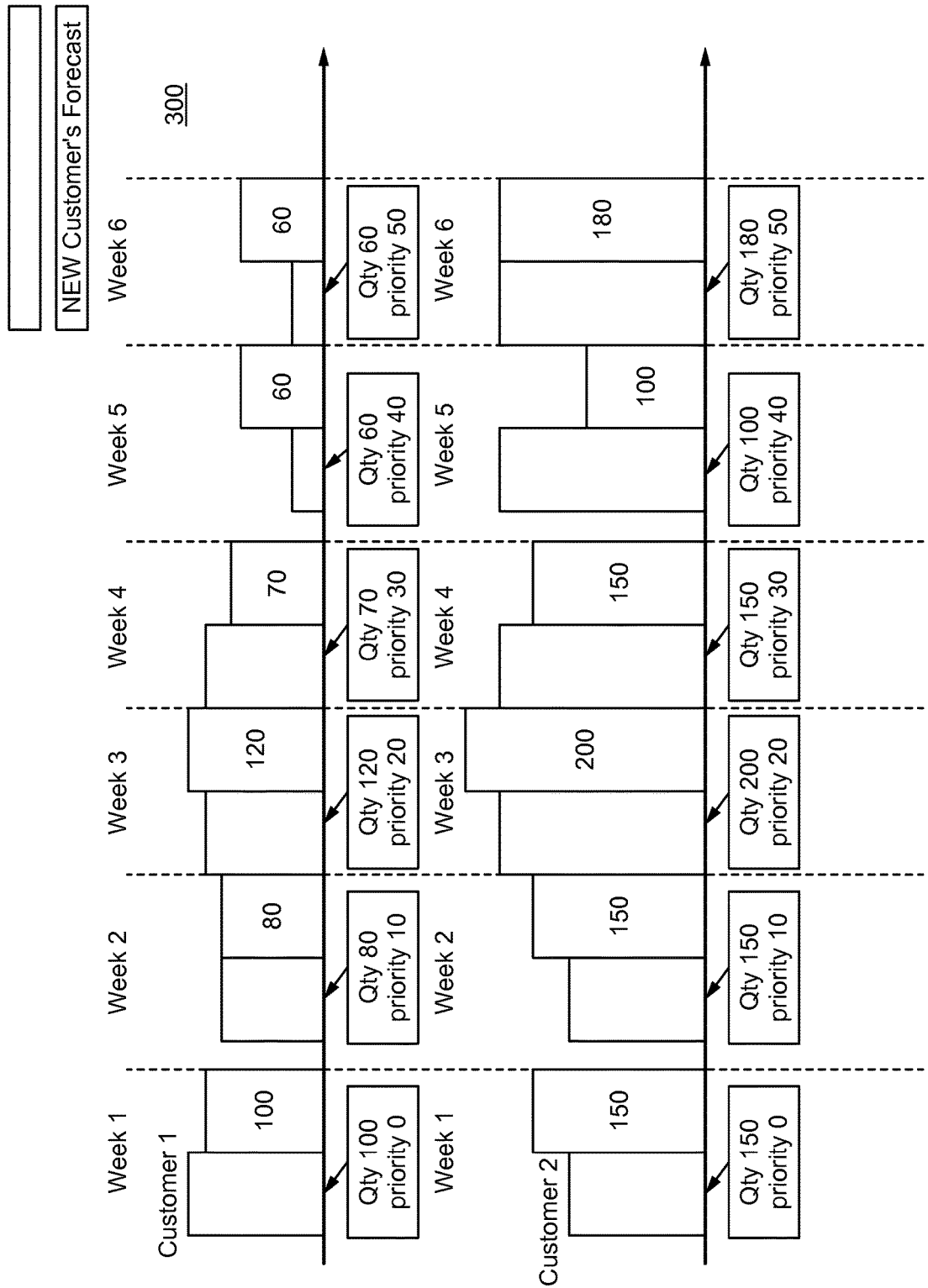
FIGS. 3A and 3B are graphical representations of the different stages of the resource allocation process shown in FIGS. 2A-L.
Figure 3B:
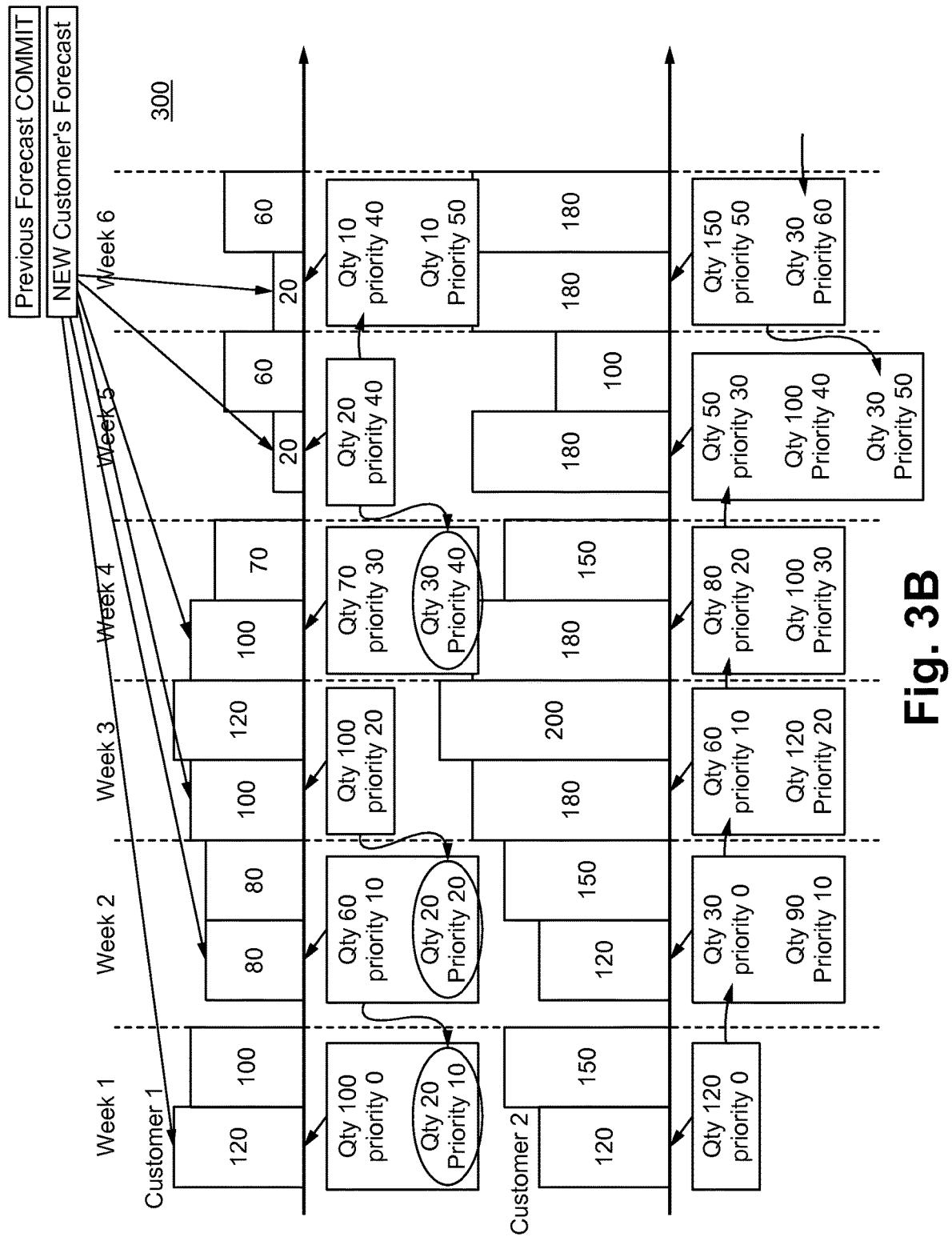

FIGS. 3A and 3B illustrate the resource distribution and priority inheritance process illustrated in FIGS. 2A-L, but using different parameters and shown in bar-graph format 300. FIG. 3A shows the previous forecast commit, which are assigned with ascending priority numbers (values) according to weeks. This way priority is assigned only when a first forecast for a specific supplier (e.g., Acme, Inc.) part is coming in. For every next forecast, the priorities are assigned according to inheritance rules, such as those illustrated in FIGS. 2C-F and 3B. A smaller priority number indicates a higher in priority in processing sequence. For the Customer 1, the committed quantity 100 has a priority 0 for week 1. In week 2, the committed quantity 80 has a priority 10. In week 3, the committed quantity 120 has a priority 20. In week 4, the committed quantity 70 has a priority 30. In week 5, the committed quantity 60 has a priority 40. In week 6, the committed quantity 60 has a priority 50. Similarly, for Customer 2, the committed quantity 150 has a priority 0 for week 1. In week 2, the committed quantity 150 has a priority 10. In week 3, the committed quantity 200 has a priority 20. In week 4, the committed quantity 150 has a priority 30. In week 5, the committed quantity 100 has a priority 40. In week 6, the committed quantity 180 has a priority 50.

FIG. 3B shows the new customer's forecast, which can be implemented by the system 200 (FIGS. 2A-L). The new customer forecast for customer 1 is 120 units for week 1, which is 20 units more than the original forecast committed. Accordingly, 100 units of priority 0 are allocated. The shortage of 20 units are borrowed from the following week (week 2), which has a priority 10. In the week 2, the original forecast is 80 units, which is the same as the quantity newly forecasted. Accordingly, 20 units more are needed to be borrowed from the following week, which has a priority 20. In week 3, the new forecast is 100 units, which is 20 units less than the originally forecast. The excess 20 units offset the shortage incurred in week 2. Similarly, the original forecast for week 4 has a quantity 70. The new forecast has a quantity of 100 units. Accordingly, the shortage of 30 units are borrowed from the week 5 with a priority 40. In week 5, the new forecast is only a quantity of 20 units. The 20 units and the borrowed 30 units both have a priority 40, which makes up 50 units of priority 40. The remaining 10 units with a priority 40 can be used in the week 6. A similar method is able to be applied on Customer 2.

While FIGS. 3A and 3B illustrate allocating a single resource to 2 customers over a 6-week period, it will be appreciated that the principles of the invention can be used to allocate any number of resources among any number of customers over any number of time periods.

Figure 4:
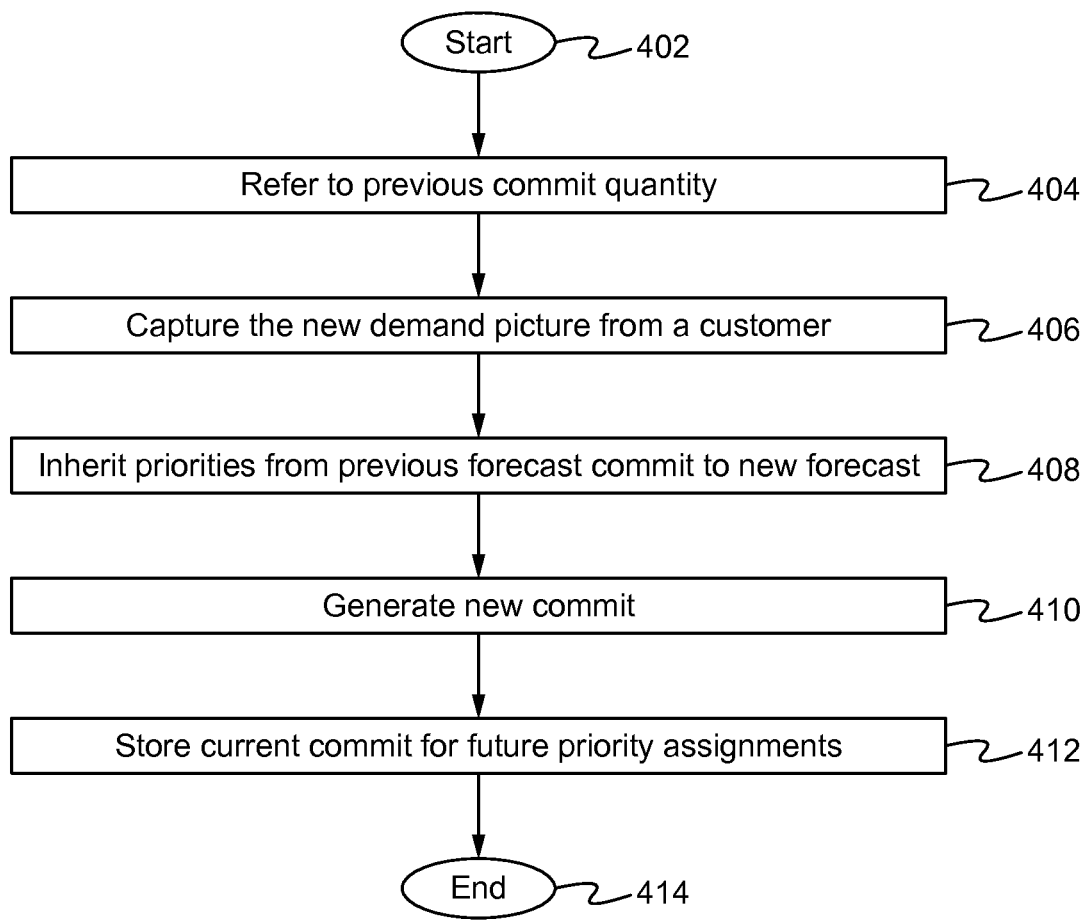
FIG. 4 is a flow chart illustrating a manufacturing management method in accordance with one embodiment of the invention.

FIG. 4 is a flow chart illustrating a manufacturing management method 400 in accordance with one embodiment of the present invention, such as one that includes any one of the methods 100, 200, and 300. The method 400 can start from Step 402. At Step 404, reference is made to the previous commit. At Step 406, a new demand picture is captured from a customer. At Step 408, priorities are inherited from previous forecast commits to new forecasts for resource allocation. At Step 410, new commit numbers are generated based on the available resource allocation to independent demand according to priorities and demand due dates, such as described above. At Step 412, the current commit is stored for future priority assignments. The method 400 can stop at Step 414.

Figure 5:
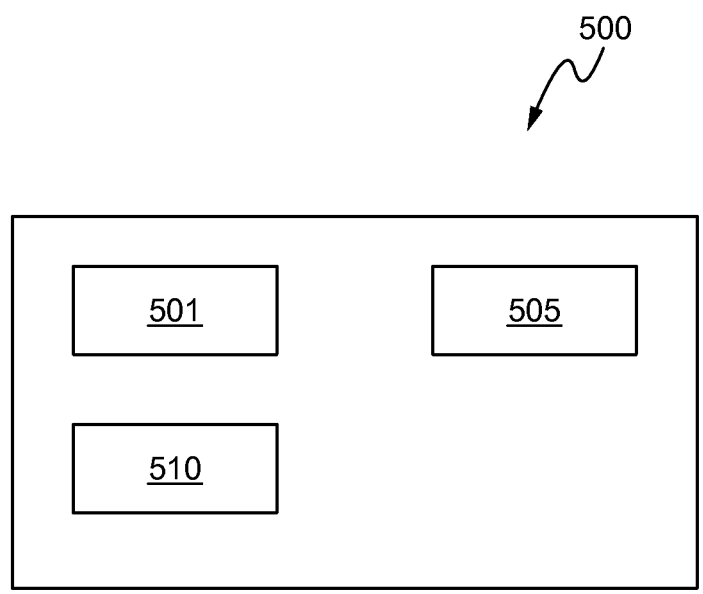
FIG. 5 is a block diagram of a system for executing a priority assignment and resource allocation process, in accordance with one embodiment of the invention.

FIG. 5 is a block diagram of a system 500 for automating demand prioritization and consistent commitment of supply chain management in accordance with one embodiment of the invention. The system 500 comprises a computer-readable medium 501 containing processor-executable instructions, a processor 505 for executing the instructions, communication ports for receiving customer forecasts (510), and optional mechanical elements (not shown), such as a robot arm for packaging units allocated to different customers. In one embodiment, the instructions perform the steps illustrated in FIG. 2A-L, 3A-B, or 4. In different embodiments, the computer-executable instructions (1) assign and update priorities to forecasted resource demands, (2) periodically check resource inventories, (3) distribute one or more resources based on first priority values assigned to a preselected portion of the resource and reassign second priority values to remaining portions of the resource, (4) control mechanical elements to package the resources for customers, or (5) any combination of these elements.

In accordance with the embodiments of the invention, a supply chain management compares new forecasts and the original commit forecasts. The difference of needed quantity between the new forecasts and the original commit forecasts are used as the basis for assigning priorities and automatically generating consistent commitment allocation for all customers. Accordingly, the methods and devices disclosed herein can be used to more efficiently manage resource supply chains.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications can be made in the embodiment chosen for illustration without departing from the spirit and scope of the invention as defined by the claims.

What is claimed is:

1. A supply chain management method of a system that includes a computer port, wherein the computer port comprises a priority assigning device, an inventory checking device and a distributing device, the method comprising:
   assigning, by the priority assigning device, a first set of priority values based on bucket dates on a time sequence to each of a first set of a customer's forecasted demand numbers on each of the bucket dates;
   receiving, at the priority assigning device, a second set of the customer's forecasted demand numbers;
   determining, by the priority assigning device for each of the bucket dates, a difference between each of a corresponding number in the first set of the customer's forecasted demand numbers and a subsequently received second set of the customer's forecasted demand numbers;
   generating, by the priority assigning device, a second set of priority values for each of the bucket dates:
   when the first set of the customer's forecasted demand numbers is greater than the second set of the customer's forecasted demand numbers of a first bucket date, assigning a corresponding priority value of the first set of priority values of the first bucket date to the second set of the corresponding customer's forecasted demand numbers, and further allocating the difference to a second bucket date and assigning the priority value of the first bucket date to the difference; and
   when the first set of the customer's forecasted demand numbers is smaller than the second set of the customer's forecasted demand numbers of the first bucket date, assigning a corresponding value of the first set of priority values of the first bucket date to a number of the first set of the corresponding customer's forecasted demand numbers, and further keeping the difference to the first bucket date while assigning the priority value of the second bucket date to the difference;
   allocating available resources, with the priority assigning device, according to the second set of the priority values; and
   controlling the distributing device to package the allocated resources for distribution.

2. The method of claim 1, wherein the first and second sets of the customer's forecasted demand numbers correspond to amounts of resources required by a customer over a fixed length of time.

3. The method of claim 2, wherein the length of time corresponds to a day, a week, a month, or a multi-month period.

4. The method of claim 1, further comprising receiving, at a supplier, forecasted demand numbers for a resource for different customers at different times and with varying frequencies.

5. The method of claim 1, wherein a smaller priority value corresponds to a higher priority.

6. The method of claim 1, wherein the resources comprise machine component parts, raw materials, or machine capacities.

7. The method of claim 1, wherein the method is automated.

8. The method of claim 1, further comprising communicating with a data store to thereby access the first set of the customer's forecasted demand numbers.

9. The method of claim 8, further comprising, after assigning a second set of priority values to the differences, generating a new commit according to the second set of priority values.

10. The method of claim 9, further comprising, after generating a new commit, storing the new commit in the data store.

11. The method of claim 1, wherein the second set of priority values is dependent on the first set of priority values assigned to the first set of the customer's forecasted demand numbers.

12. A customer orders management method of a system that includes a computer port, wherein the computer port comprises a priority assigning device, an inventory checking device and a distributing device, the method comprising:
   receiving, at the priority assigning device, a first customer's forecasted quantities of a resource for sequential time periods;
   receiving, at the priority assigning device, a second customer's forecasted quantities of the resource for the sequential time periods;
   assigning, by the priority assigning device, priority values based on each of bucket dates on the sequential time periods to each of the first and second customer's forecasted quantities corresponding to each of their respective bucket dates;
   receiving, at the priority assigning device, the second customer's updated forecasted quantities for the sequential time periods;

determining, by the priority assigning device for each of the bucket dates, a difference between a corresponding number in the second customer's forecasted quantity and the second customer's updated forecasted quantity;

generating, by the priority assigning device, updated priority values for each of the bucket dates:

when the second customer's forecasted quantity is greater than the second customer's updated forecasted quantities of a first bucket date, assigning a priority value of a first bucket date to the second customer's updated forecasted quantities, and further allocating the difference to a second bucket date and assigning the priority value of the first bucket date to the difference;

when the second customer's forecasted quantity is smaller than the second customer's updated forecasted quantities of the first bucket date, assigning the first set of priority values of the first bucket date to a number of the second customer's forecasted quantity, and further keeping the difference to the first bucket date while assigning the priority value of the second bucket date to the difference;

allocating available resources, with the priority assigning device, based on the updated priority values; and controlling the distributing device to package the allocated resources for distribution.

13. The method of claim 12, wherein forecasted quantities for the sequential time periods are assigned sequentially increasing priority values.

14. The method of claim 12, wherein priority values for the sequential times periods incorporate inherent priority values from previous time periods.

15. The method of claim 12, further comprising storing the updated priority values and the differences for subsequent cycles of demand evaluation.

16. The method of claim 12, the method is automated.

17. The method of claim 12, wherein the updated priority values are dependent on the priority values previously assigned to the second customer's forecasted quantities.

18. A supply chain management method of a system that includes a computer port, wherein the computer port comprises a priority assigning device, an inventory checking device and a distributing device, the method comprising:

assigning, by the priority assigning device, a first set of priority values based on bucket dates on a time sequence to each of a first set of a customer's forecasted demand numbers corresponding to a respective bucket date;

receiving, at the priority assigning device, a second set of customer's forecasted demand numbers;

determining, for each of the bucket dates, a difference between a corresponding number in the first set of customer's forecasted demand numbers and a subsequently received second set of customer's forecasted demand numbers;

generating, by the priority assigning device, a second set of priority values for each of the bucket dates:

when the first set of customer's forecasted demand numbers is greater than the subsequently received second set of customer's forecasted demand numbers of a first bucket date, assigning the first set of priority values of the first bucket date to the subsequently received second set of customer's forecasted demand numbers, and further allocating the difference to a second bucket date and assigning the priority value of the first bucket date to the difference; and when the first set of customer's forecasted demand numbers is smaller than the subsequently received second set of customer's forecasted demand numbers of the first bucket date, assigning a first set of priority values of a first bucket date to a number of the first set of customer's forecasted demand number, and further keeping the difference to the first bucket date while assigning the priority value of the second bucket date to the difference;

allocating available resources, with the priority assigning device, according to the second set of the priority values and to the differences; and controlling the distributing device to package the allocated resources for distribution.

19. The method of claim 18, wherein the second set of the customer's forecasted demand numbers indicate a forecast of future needs.

20. The method of claim 19, further comprising assigning the first set of priority values to numbers of the second set of forecasted demand numbers that are no more than the first set of forecasted demand numbers.

* * * * *